G. J. BENNETT.
Milk Strainer.

No. 66,552.

Patented July 9, 1867.

Witnesses:

Inventor:

United States Patent Office.

GEORGE J. BENNETT, OF HOMER, NEW YORK.

Letters Patent No. 66,552, dated July 9, 1867.

IMPROVED CREAM-STRAINER.

The Schedule referred to in these Letters Patent and making part of the same.

TO ALL WHOM IT MAY CONCERN:

Be it known that I, GEORGE J. BENNETT, of Homer, in the county of Cortland, and State of New York, have invented a new and improved Cream-Strainer; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a cream-strainer, which consists of a cylindrical vessel with concave bottom, in which a sieve or strainer is secured in such a manner that it can be easily removed or put on.

A disk having inclined wings, similar to those of a screw-propeller, is suspended directly above the strainer from a vertical shaft, and forces the cream through the meshes of the strainer when the shaft is revolved by a crank or other suitable device. Below the strainer is secured to the bottom of the vessel an inverted funnel, which protects the strainer and directs the flow of the cream after the same has been forced through the strainer.

Figure 1:
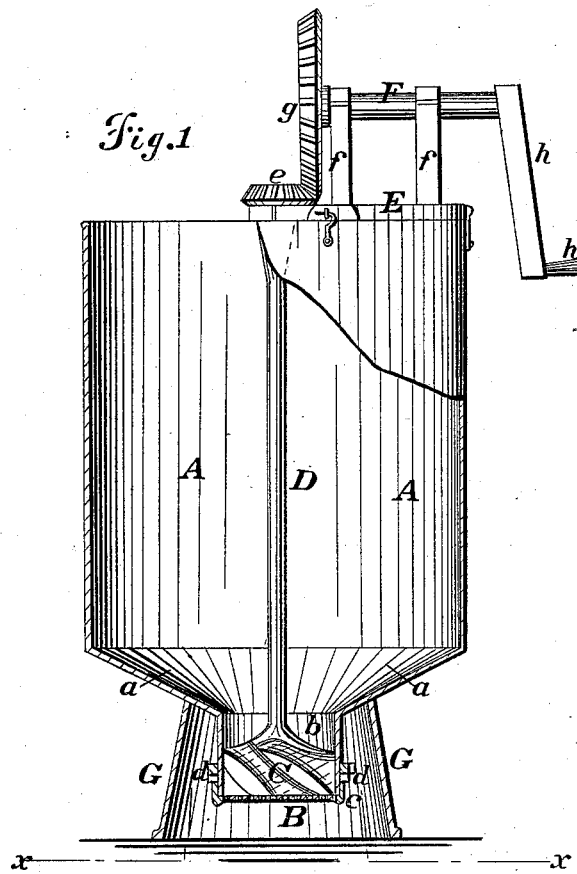
Figure 1 is a side view, partly in section, of my improved cream-strainer.
Figure 2:
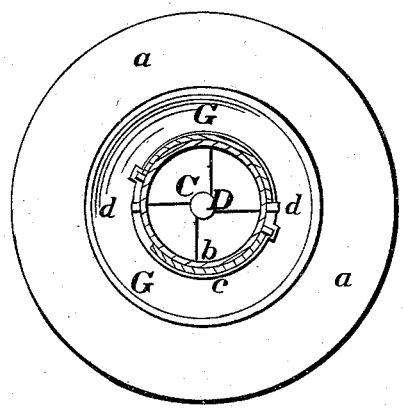
Figure 2 is an inverted horizontal sectional view of the same taken in the line $x\ x$, fig. 1.

A represents a cylindrical vessel, made of sheet metal or other suitable material, which is open at the top, as shown in fig. 1. Its bottom, $a$, is made concave, that is, its rim is highest, and a circular opening is made in its centre, and around the same is secured to the under side of the bottom a vertical flange, $b$, as is clearly shown in the drawing. B is a circular flat sieve or strainer, stamped out of sheet metal, or made of wire netting or other suitable material. It is secured to a cylindrical sheet-metal plate, $c$, which is provided with L-shaped slots, whereby it can be secured to and around the cylindrical flange $b$, on the outside of which lugs $d$ are provided for the purpose. The strainer thus forms the central portion of the bottom of the vessel A, and the cream that may be poured into the said vessel will flow on the inclined bottom $a$ into the cylinder $b$ and then pass through the strainer into a proper receptacle. But the cream would not flow through the strainer with sufficient rapidity, and it would injure the cream if it were much stirred for the purpose of forcing it through the meshes. To avoid both these difficulties I have arranged a screw, C, which consists of four (more or less) wings, which are set inclined around the lower end of a vertical shaft, D, and which screw is suspended directly above the strainer. The shaft D is hung in a plate, E, which can be easily removed from or secured to the top of the vessel A, and is at its top provided with a pinion, $e$. A horizontal shaft, F, which is mounted in uprights $f\ f$, that are secured to the plate E, is provided with a bevel gear-wheel, $g$, at one, and with a crank, $h$, at the other end. As the wheel $g$ meshes into the pinion $f$, the shaft D is revolved, and with it the screw $c$, as soon as the crank $h$ is turned. The screw C when revolved forces the cream through the strainer. The edges of its wing are bevelled off, so that the same cut through the cream and do not injure the same by striking it. To the under side of the bottom $a$, and around the strainer, is secured an inverted hopper, G, which projects beyond the strainer and protects the same. It also guides the flow of the cream after the same has been forced through the strainer, and prevents the same from flowing along the under side of the vessel A.

Having thus described my invention, what I claim as new, and desire to secure by Letters Patent, is—

1. The screw C, when arranged as described, in combination with the removable strainer B, all made and operating substantially as herein shown and described.

2. The hopper G, when arranged as described, in combination with the strainer B, screw C, and bottom $a$ of the vessel A, all made and operating substantially as set forth.

3. A cream-strainer, made and operating substantially as herein shown and described.

GEO. J. BENNETT.

Witnesses:
PHARUS S. NORTHRUP,
LORIN NORTHRUP.